United States Patent
Enomoto

(10) Patent No.: US 10,313,534 B2
(45) Date of Patent: Jun. 4, 2019

(54) DATA PROCESSING APPARATUS AND STORAGE MEDIUM

(71) Applicant: FUJI XEROX CO., LTD., Tokyo (JP)

(72) Inventor: Naoyuki Enomoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 20 days.

(21) Appl. No.: 15/801,816

(22) Filed: Nov. 2, 2017

(65) Prior Publication Data
US 2018/0241889 A1 Aug. 23, 2018

(30) Foreign Application Priority Data
Feb. 17, 2017 (JP) ................................ 2017-027990

(51) Int. Cl.
| | |
|---|---|
| H04N 1/00 | (2006.01) |
| G06K 9/18 | (2006.01) |
| G06K 9/00 | (2006.01) |
| G06K 9/20 | (2006.01) |
| G08B 3/10 | (2006.01) |

(52) U.S. Cl.
CPC ..... H04N 1/00037 (2013.01); G06K 9/00442 (2013.01); G06K 9/18 (2013.01); G06K 9/2054 (2013.01); H04N 1/00488 (2013.01); H04N 1/00758 (2013.01); H04N 1/00779 (2013.01); H04N 1/00795 (2013.01); G06K 2209/01 (2013.01); G08B 3/10 (2013.01)

(58) Field of Classification Search
CPC ............ H04N 1/0037; H04N 1/00758; H04N 1/00488; G06K 9/00442
See application file for complete search history.

(56) References Cited

U.S. PATENT DOCUMENTS

| | | | | |
|---|---|---|---|---|
| 5,461,492 A | * | 10/1995 | Jones ................. | H04N 1/00567 353/95 |
| 6,034,785 A | * | 3/2000 | Itoh ........................ | G06K 15/00 358/1.18 |
| 7,318,033 B2 | * | 1/2008 | Okutani ............... | H04N 1/0035 704/260 |
| 2001/0012136 A1 | * | 8/2001 | Kurosawa ............. | H04N 1/047 358/487 |
| 2005/0168763 A1 | * | 8/2005 | Higuchi ............. | H04N 1/00442 358/1.13 |

(Continued)

FOREIGN PATENT DOCUMENTS

JP 2004-070523 A 3/2004

*Primary Examiner* — Ted W Barnes
(74) *Attorney, Agent, or Firm* — Oliff PLC

(57) ABSTRACT

A data processing apparatus includes a preread data acquisition unit that reads a document with preread setting, and acquires preread data including plural preread page data; and a main processing data generation unit that generates main processing data on the basis of main read setting applied to main processing on the document, the preread setting, and a document property of each page of the document acquired by analyzing the preread data, by using, for a page with corresponding one of the preread page data satisfying the main read setting, the corresponding preread page data, and by using main read page data acquired by reading the document with the main read setting for a page with corresponding one of the preread page data not satisfying the main read setting, among pages included in the document.

6 Claims, 5 Drawing Sheets

(56) References Cited

U.S. PATENT DOCUMENTS

| | | | |
|---|---|---|---|
| 2006/0265242 A1* | 11/2006 | Kashioka | H04N 1/00968 382/100 |
| 2009/0059257 A1* | 3/2009 | Kondo | H04N 1/6075 358/1.9 |
| 2018/0097954 A1* | 4/2018 | Hachiro | H04N 1/00755 |

* cited by examiner

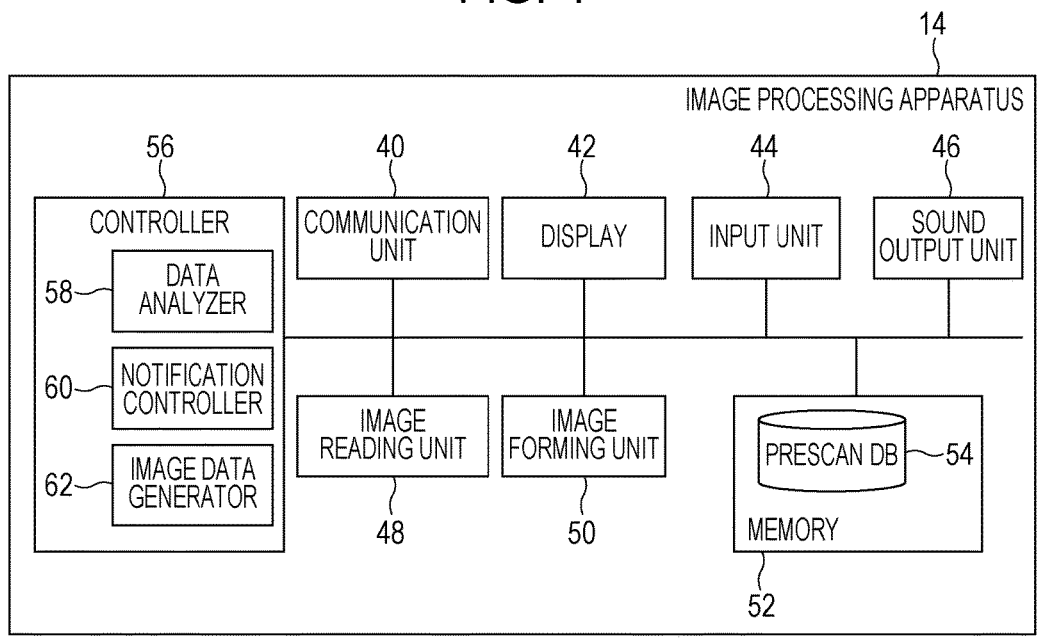

DATA PROCESSING APPARATUS AND STORAGE MEDIUM

CROSS-REFERENCE TO RELATED APPLICATIONS

This application is based on and claims priority under 35 USC 119 from Japanese Patent Application No. 2017-027990 filed Feb. 17, 2017.

BACKGROUND

(i) Technical Field

The present invention relates to a data processing apparatus and a storage medium.

(ii) Related Art

A user who uses an image processing apparatus may not occasionally visually recognize the content of a paper document (document) to be processed by the image processing apparatus, for example, when the user is a visually impaired person. In such a case, the document may be wrong, or the document may be incorrectly set (for example, the front and back sides of the document may be inversely set).

SUMMARY

According to an aspect of the invention, there is provided a data processing apparatus includes a preread data acquisition unit that reads a document with preread setting, and acquires preread data including plural preread page data; and a main processing data generation unit that generates main processing data on the basis of main read setting applied to main processing on the document, the preread setting, and a document property of each page of the document acquired by analyzing the preread data, by using, for a page with corresponding one of the preread page data satisfying the main read setting, the corresponding preread page data, and by using main read page data acquired by reading the document with the main read setting for a page with corresponding one of the preread page data not satisfying the main read setting, among pages included in the document.

BRIEF DESCRIPTION OF THE DRAWINGS

An exemplary embodiment of the present invention will be described in detail based on the following figures, wherein:

FIG. 4 is a schematic configuration diagram of an image processing apparatus according to this exemplary embodiment;

FIG. 5 is a conceptual diagram illustrating an example of contents of a prescan DB;

DETAILED DESCRIPTION

An exemplary embodiment of the invention is described below.

Figure 1:
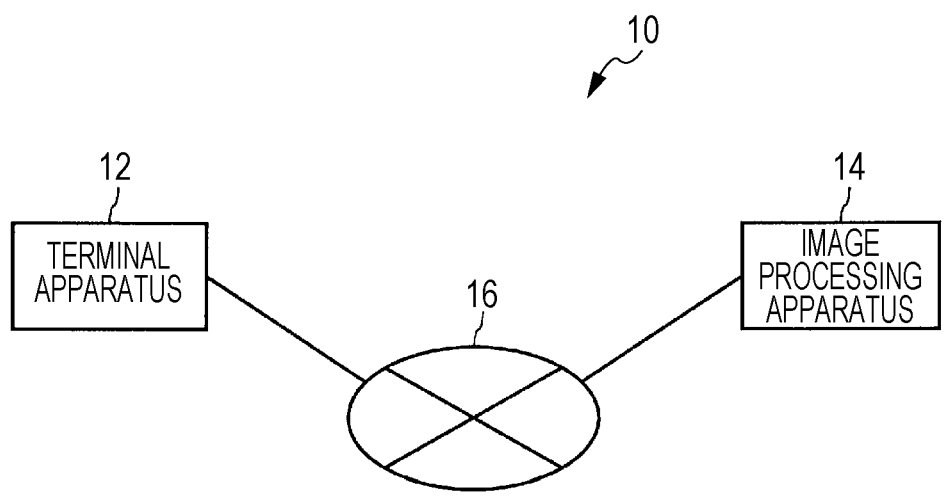
FIG. 1 is a schematic configuration diagram of an image processing system according to this exemplary embodiment.

FIG. 1 is a schematic configuration diagram of an image processing system 10 according to this exemplary embodiment. The image processing system 10 includes a terminal apparatus 12 and an image processing apparatus 14 serving as a data processing apparatus. The terminal apparatus 12 and the image processing apparatus 14 are connected to each other in a manner available for communication through a communication line 16. The communication line 16 is configured of, for example, the Internet, a local area network (LAN), or near field wireless communication. In the example in FIG. 1, one terminal apparatus 12 and one image processing apparatus 14 are illustrated; however, the image processing system 10 may include plural terminal apparatuses 12 and plural image processing apparatuses 14.

The terminal apparatus 12 is a terminal that is used by a user who uses the image processing apparatus 14. The user according to this exemplary embodiment is, for example, a person who is not able to sufficiently visually recognize the content of a document, such as a visually impaired person (hereinafter, merely referred to as "visually impaired person"). In this exemplary embodiment, the terminal apparatus 12 is a mobile terminal, such as a tablet terminal, a smartphone, or a cellular phone. However, the terminal apparatus 12 may be a desktop terminal of a personal computer (PC). Although described later, a job application is operable in the terminal apparatus 12 according to this exemplary embodiment. The job application is for inputting a processing command (job) to the image processing apparatus 14 and for making processing setting relating to the job in the image processing apparatus 14.

Particularly in this exemplary embodiment, the user may instruct the image processing apparatus 14 to execute preread processing (prescan) that is executed before image processing (main processing) for a copy job, a scan job, or a fax job, by operating the job application. The prescan is executed by the user who is a visually impaired person to ensure whether a document to be processed is intended one. To be specific, character information is extracted from image data (prescan data) acquired by prescan, and the extracted character information is output by sound. The user listens to the output sound, and hence the user is able to determine whether a paper document to be processed is intended one.

Also, if the distance between the terminal apparatus 12 and the image processing apparatus 14 is within a predetermined distance, and if near field communication is established between these apparatuses, an operation on the image processing apparatus 14 may be performed by using the terminal apparatus 12.

The image processing apparatus 14 is an apparatus having an image processing function. For example, the image processing apparatus 14 has a scan function, a print function, a copy function, and a fax function. Among these functions, this exemplary embodiment focuses on the scan function, the copy function, and the fax function. The scan function executes scan processing (reading processing) on a paper document (including film document etc.) that is an analog document and generates image data. The copy function executes print processing on a print medium such as paper, for image data acquired by the scan processing. The fax function faxes image data acquired by executing the scan processing on a paper document.

For a job input by the user, the image processing apparatus 14 executes processing corresponding to processing setting set for the job. The job according to this exemplary embodiment includes a processing command for the image processing apparatus 14, and processing setting that is setting relating to the processing command. In this exemplary embodiment, the user inputs a job from the terminal apparatus 12 to the image processing apparatus 14; however, the user may input the job to the image processing apparatus 14 by directly executing processing on the image processing apparatus 14.

Figure 2:
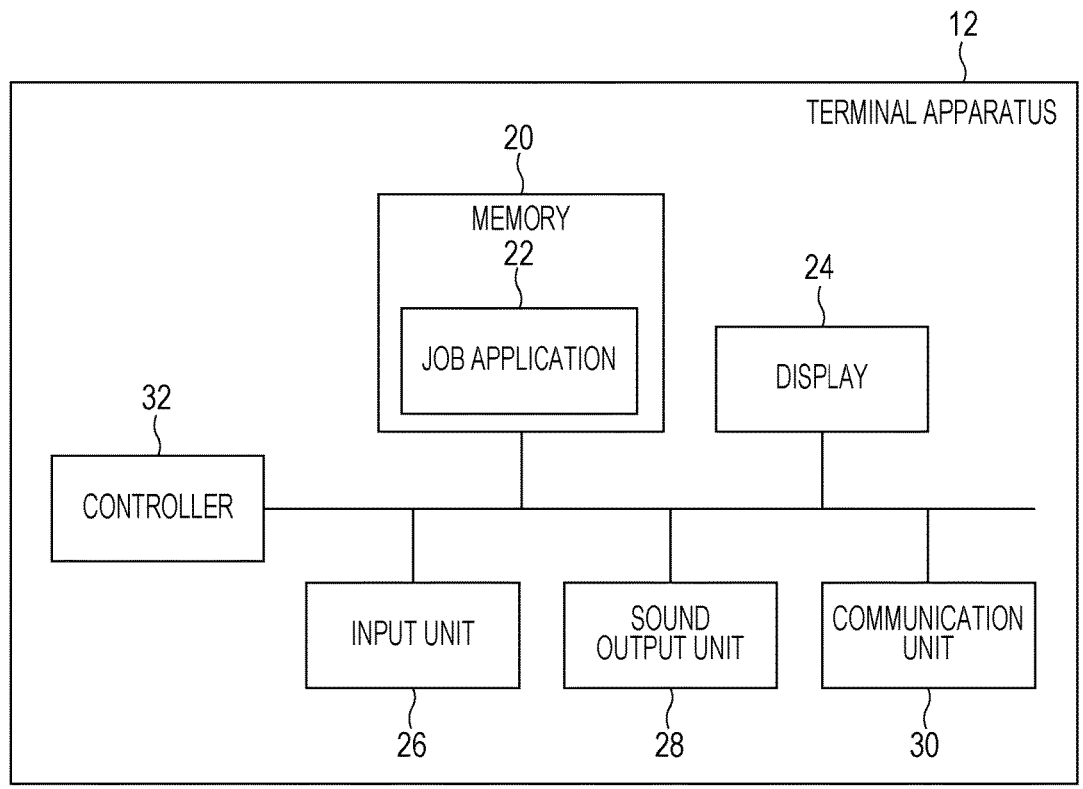
FIG. 2 is a schematic configuration diagram of a terminal apparatus according to this exemplary embodiment.

FIG. 2 is a schematic configuration diagram of the terminal apparatus 12. Respective units of the terminal apparatus 12 are described below with reference to FIG. 2.

A memory 20 includes a read only memory (ROM) and a random access memory (RAM). The memory 20 stores programs for operating the respective units of the terminal apparatus 12. Also, as illustrated in FIG. 2, a job application 22 operable in the terminal apparatus 12 is stored (installed) in the memory 20. The user may perform an instruction operation such as input of a job from the terminal apparatus 12 to the image processing apparatus 14 by executing the job application 22 in the terminal apparatus 12.

A display 24 is configured of, for example, a liquid crystal panel. The display 24 displays various notification screens etc. for the user who uses the terminal apparatus 12. The display 24 also displays a screen (user interface) of the job application 22 when the job application 22 operates.

An input unit 26 is configured of, for example, a touch panel or a button. The input unit 26 is for inputting an instruction of the user to the terminal apparatus 12.

A sound output unit 28 is configured of, for example, a speaker and a driving circuit of the speaker. The sound output unit 28 outputs various information to the user who is a visually impaired person in the form of sound so as to notify the user about the various information.

A communication unit 30 is configured of, for example, a network adopter etc. The communication unit 30 is a what is called communication interface, and has a function of receiving/transmitting data from/to the image processing apparatus 14 through the communication line 16. The communication unit 30 may be a communication interface having a wireless communication function, or a communication interface having a wired communication function.

A controller 32 is configured of a central processing unit (CPU) or a micro controller. The controller 32 controls the respective units of the terminal apparatus 12.

Figure 3:
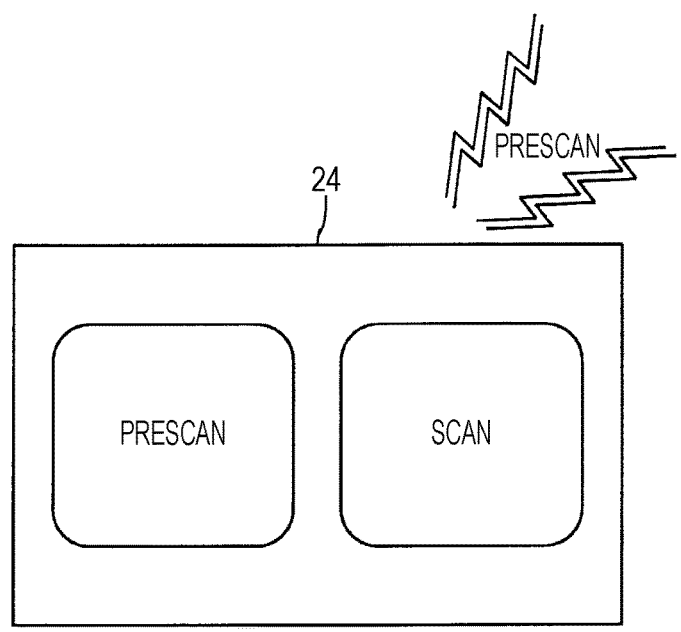
FIG. 3 illustrates an example of a top screen of a job application.

FIG. 3 illustrates an example of a screen of the job application. FIG. 3 illustrates a top screen when the scan function is selected in the job application. In the top screen, a "prescan" button and a "scan" button are displayed. The job application has a function of assisting the user who is a visually impaired person. For example, when the user touches the "prescan" button once, the sound output unit 28 outputs sound of "prescan." Accordingly, the user may recognize that the button that the user touches now is the "prescan" button although the user is not able to sufficiently visually recognize the screen. Then, when the user touches the "prescan" once again, the terminal apparatus 12 transmits a prescan instruction to the image processing apparatus 14. Likewise, in a case of the "scan" button, when the user touches the "scan" button once, the sound output unit 28 outputs sound of "scan." Then, when the user touches the "scan" button once again, the terminal apparatus 12 inputs a scan job to the image processing apparatus 14.

FIG. 4 is a schematic configuration diagram of the image processing apparatus 14. Respective units of the image processing apparatus 14 are described below with reference to FIG. 4.

A communication unit 40 is configured of, for example, a network adopter etc. The communication unit 40 is a what is called communication interface, and has a function of receiving/transmitting data from/to the terminal apparatus 12 through the communication line 16. The communication unit 40 may be a communication interface having a wireless communication function, or a communication interface having a wired communication function. The communication unit 40 may be connected to a public line. Hence, the communication unit 40 is used when the image processing apparatus 14 provides the fax function.

A display 42 is configured of, for example, a liquid crystal panel. The display 42 displays various operation screens or various information of the image processing apparatus 14.

An input unit 44 is configured of, for example, a touch panel or a button. The input unit 44 receives an input operation from the user.

A sound output unit 46 is configured of, for example, a speaker and a driving circuit of the speaker. The sound output unit 46 outputs the contents of the various operation screens or the various information displayed on the display 42 in the form of sound so as to notify the user who is a visually impaired person about the contents of the various operation screens or the contents of the various information. Although described later, the sound output unit 46 also functions as an alert output unit and a document content notification unit.

An image reading unit 48 includes, for example, a light source or a charge-coupled device (CCD) image sensor. The image reading unit 48 executes reading processing (scan processing) on a paper document that is a document. Hence, the image reading unit 48 is used when the image processing apparatus 14 provides the scan function, the copy function, or the fax function. The image reading unit 48 may execute the scan processing on a paper document set on a document plate (not illustrated) of the image processing apparatus 14. If the paper document includes plural pages, respective pages are sequentially sent from the document plate to a reading position. Hence the image reading unit 48 may continuously execute the scan processing on the respective pages.

When the user inputs a copy job, a scan job, or a fax job to the image processing apparatus 14, if the user instructs the image processing apparatus 14 to execute prescan, the image reading unit 48 executes the prescan processing on a paper document. In this exemplary embodiment, the image reading unit 48 executes the prescan processing on the entirety (all pages) of the paper document. By executing the prescan processing, prescan data including plural prescan page data corresponding to the respective pages of the paper document is acquired. The prescan page data corresponds to preread page data. The prescan data corresponds to preread data. As described above, the image reading unit 48 also functions as a preread data acquisition unit.

The prescan processing is executed with prescan setting as preread setting. In this exemplary embodiment, it is assumed that the content of the prescan setting is previously determined by a manager or a user of the image processing apparatus 14. Setting items included in setting relating to the scan processing include, for example, "resolution," "color mode," "image quality of document," "scan side designation," "automatic erect designation," "blank paper detection designation," and "skew correction designation." This exemplary embodiment focuses on the "resolution" and "color mode" among the above-described setting items.

The "resolution" represents a pixel density of image data that is generated by the scan processing. For example, setting values of 200 dots per inch (DPI), 300 DPI, 400 DPI, and 600 DPI may be taken. The "color mode" represents a color mode of image data that is generated by the scan processing. When "color" is selected for the color mode, image data becomes a color image. When "black and white" is selected for the color mode, image data becomes a black and white image.

The setting values for the respective setting items included in the prescan setting according to this exemplary embodiment are as follows. The setting value for the setting item "resolution" is set at a level that enables execution of optical character recognition (OCR) processing (character recognition processing) on prescan data or higher. In this exemplary embodiment, "300 DPI" is set. Of course a resolution higher than 300 DPI may be set. However, in this exemplary embodiment, a minimum resolution as possible is set as long as the OCR processing is enabled in view of decreasing the volume of prescan data as possible or increasing the speed of the prescan processing. The setting value for the setting item "color mode" is set at "black and white" in view of decreasing the volume of prescan data or increasing the speed of the prescan processing.

The image reading unit 48 acquires a document property of a paper document for each page included in the paper document. In this exemplary embodiment, a color property indicative of whether or not a page includes a color (a color other than black and white) as a document property. Of course the document property to be acquired is not limited thereto, and may include another property. The image reading unit 48 executes scan processing on each page included in the paper document for the prescan processing, and hence the image reading unit 48 may acquire the document property of each page of the paper document by the scan processing. For example, in this exemplary embodiment, "black and white" is set for the setting item "color mode" in the prescan setting. The prescan data is black and white. However, it may be judged whether or not each page of the paper document includes a color in the course of the scan processing.

The document property of each page of the paper document, each prescan page data, and prescan setting acquired by the prescan processing are associated with one another, and stored in a prescan database (DB) 54 constructed in a memory 52. The prescan page data in this exemplary embodiment is stored in the form of bitmap data. Alternatively, the prescan page data may be stored in tagged image file format (TIFF), or compressed form (for example, ZIP form) by compressing data of non-compressed form such as the bitmap form or TIFF. If the prescan page data is stored in the compressed form, to read the prescan page data from the prescan DB 54 later, the data is uncompressed (decompressed) and read.

Also, when the user gives an instruction for executing main processing of a copy job, a scan job, or a fax job, the image reading unit 48 executes the scan processing on a paper document on the basis of main scan setting as main processing read setting designated by the user, and acquires main scan page data as main read page data. That is, the image reading unit 48 also functions as a main read data acquisition unit. The acquired main scan page data is transmitted to a controller 56 (in particular, image data generator 62), which will be described later. The details of operations of the image reading unit 48 at the main processing are described later.

An image forming unit 50 includes a print unit that executes print processing for reproducing image data generated by the image data generator 62 (described later) on a print medium such as paper when a copy job is input to the image processing apparatus 14. As described above, the image forming unit 50 is used when the image processing apparatus 14 provides the copy function.

The memory 52 includes a hard disk, a ROM, or a RAM. The memory 52 stores a data processing program for operating the respective units of the image processing apparatus 14. Also, as illustrated in FIG. 4, the prescan DB 54 is defined in the memory 52.

The prescan DB 54 stores, as described above, the document property of each page of a paper document, each prescan page data, and prescan setting acquired through the prescan processing by the image reading unit 48 in an associated manner. FIG. 5 illustrates an example of contents of the prescan DB 54. FIG. 5 illustrates contents that are stored in the prescan DB 54 when the prescan processing is executed on a paper document including 10 pages.

The prescan DB 54 illustrated in FIG. 5 stores "color" which is the document property of page 1 acquired through the prescan processing on page 1 of a paper document by the image reading unit 48 and prescan page data named "scan1_p1.bmp" acquired by the prescan processing on page 1 of the paper document in an associated manner. Likewise on page 2 to page 10, the prescan DB 54 stores the document property of each page and prescan page data in an associated manner. Also, in the example in FIG. 5, the same prescan setting is applied to each page of a paper document corresponding to one job, and hence in the prescan DB 54, the same prescan setting is associated with the document property of each page and prescan page data.

With reference to the prescan DB 54 illustrated in FIG. 5, it may be recognized that the paper document includes page 1 and page 10 with colors (color pages) and page 2 to page 9 of black and white without colors (black and white pages). The contents stored in the prescan DB 54 may be deleted when the main processing on the paper document is completed.

Referring back to FIG. 4, the controller 56 is configured of a CPU, a micro controller, etc. The controller 56 controls the respective units of the image processing apparatus 14 in accordance with a data processing program stored in the memory 52. Also as illustrated in FIG. 4, the controller 56 includes a data analyzer 58, a notification controller 60, and the image data generator 62 serving as a main processing data generation unit.

The data analyzer 58 executes analysis processing on prescan data acquired through prescan by the image reading unit 48. To be specific, the data analyzer 58 executes OCR processing on the prescan data. The OCR processing is processing of distinguishing characters included in the prescan data and extracting character information. In particular, character information indicative of the contents of the paper document is acquired by the OCR processing. That is, the data analyzer 58 functions as a character information extraction unit. Since the OCR processing aims at acquiring the character information indicative of the contents of the paper document, the data analyzer 58 may execute the OCR processing on only part of the prescan data instead of executing the OCR processing on the entire prescan data. For example, the data analyzer 58 may extract only characters with a predetermined size or larger, or may execute the OCR processing on a title portion of the paper document, a header portion of each page, or a footer portion of each page.

The notification controller 60 executes processing of notifying the user about the character information extracted through the OCR processing on the prescan data by the data analyzer 58. To be specific, the notification controller 60 causes the display 42 to display the extracted character information, and causes the sound output unit 46 to output sound. Thus, the user is notified about the contents of the paper document. In particular, since the contents of the paper document are output by sound, the user who is a visually impaired person may properly recognize whether or not the paper document to be processed is intended one.

In this exemplary embodiment, the data analyzer 58 executes the OCR processing on the prescan data after the prescan on all pages of the paper document is ended. However, the data analyzer 58 may execute the OCR processing on each prescan page data every time when prescan page data is generated by the prescan. That is, the OCR processing, the output of sound about the character information, and the prescan may be simultaneously executed. In this case, if information indicative of that a paper document is intended one is input by the user during the prescan, the data analyzer 58 may omit the OCR processing on the prescan page data acquired after the input of the information. If information indicative of that a paper document is intended one is input by the user during the prescan, the prescan to be executed thereafter loses the original purpose of prescan. Hence, the prescan may be thereafter executed with prescan setting changed to enhance the possibility of using the prescan page data as image data for main processing (described later in more detail). For example, the prescan setting may be changed such that the setting value for the setting item "color mode" is changed from "black and white" to "color."

The image data generator 62 generates image data as main processing data. The main processing data is the processing result of a job input by the user, or data to be processed of the job. To be specific, the main processing data is image data acquired through the scan processing by the image reading unit 48. For a copy job, the image data serving as the main processing data is the processing result of the job. For a print job, the image data serving as the main processing data is data to be printed. For a fax job, the image data as the main processing data is data to be faxed.

The image data generator 62 starts generation processing for image data in response to a trigger that, after the image reading unit 48 ends the prescan, the user sets the paper document on the document plate again, inputs main scan setting as main read setting, and instructs the start of the main processing. The main scan setting includes setting items, such as "resolution," "color mode," "image quality of document," "scan side designation," "automatic erect designation," "blank paper detection designation," and "skew correction designation." The user may input desirable setting values for the setting items. In the main scan setting, the "resolution" and "color mode" are focused among the above-described setting items.

In this exemplary embodiment, the image data generator 62 generates image data by using prescan page data acquired by the prescan and stored in the prescan DB 54. To be specific, the image data generator 62 generates image data based on the main scan setting input by the user, the prescan setting stored in the prescan DB 54, and the document property of each page of the paper document, by using, for a page with corresponding prescan page data satisfying the main scan setting, the corresponding prescan page data, and by using main scan page data acquired by the image reading unit 48 executing the scan processing (main scan processing) on the paper document with the main scan setting for a page with corresponding prescan page data not satisfying the main scan setting, among pages of the paper document.

The situation "prescan page data satisfying main scan setting" represents that prescan page data has at least a grade (that is, high grade equal to or higher) of the processing result which may be acquired when the scan processing is temporarily executed on prescan page data of a corresponding page with the main scan setting (hereinafter, referred to as temporary scan page data"). The judgment on whether or not the prescan page data satisfies the main scan setting is made for each page of the paper document. The judgment on whether or not the prescan page data has a grade equal to or higher than the grade of the temporary scan page data is made for each setting item included in the prescan setting and the main scan setting. In this exemplary embodiment, the grades are compared for the setting items "resolution" and "color mode." When only the setting value is focused, for the setting item "resolution," one with higher DPI being the setting value has a higher grade. For the setting item "color mode," the setting value "color" may have a higher grade than that of the setting value "black and white."

For the setting item "resolution," the grades of the prescan page data and the temporary scan page data may be compared with each other by comparison between the prescan setting (setting value for setting item "resolution") and the main scan setting (setting value for setting item "resolution") regardless of the document property of a page of the paper document. To be specific, if the setting value for the setting item "resolution" included in the prescan setting is equal to or larger than the setting value for the setting item "resolution" included in the main scan setting, the grade of the prescan page data is equal to or higher than the grade of the temporary scan page data.

For the setting item "color mode," the grades of the prescan page data and the temporary scan page data are compared with each other by comparison of the document property of a page of the paper document, the prescan setting (setting value for setting item "color mode"), and the main scan setting (setting value for setting item "color mode"). For a black and white page included in pages of the paper document, prescan page data and temporary scan page data may have equal grades in both the prescan setting and the main scan setting. For a black and white page, even if the setting value "color" is set for the setting item "color mode" in the main scan setting, the temporary scan page data becomes black and white. In contrast, for a color page included in pages of the paper document, the grades of the prescan page data and the temporary scan page data may be compared with each other by comparison between the prescan setting and the main scan setting. To be specific, the grade of the prescan page data is equal to or higher than the grade of the temporary scan page data if both the prescan setting and the main scan setting are "black and white," both the prescan setting and the main scan setting are "color," and the prescan setting is "color" and the main scan setting is "black and white."

If it is judged that the grade of the prescan page data is equal to or higher than the grade of the temporary scan page data in all aforementioned setting items ("resolution" and "color mode"), it is judged that the entire prescan page data has a grade equal to or higher than the grade of the temporary scan page data, that is, the prescan page data satisfies the main scan setting. The image data generator 62 executes the judgment processing on each page of the paper document. The image data generator 62 determines whether it uses the prescan page data or the main scan page data for each page in accordance with the result of the judgment processing.

Processing of the image data generator 62 is described below by using specific examples.

It is assumed that a paper document to be processed includes color pages on page 1 and page 10, and black and white pages on page 2 to page 9. Also, it is assumed that prescan is executed with the same prescan setting, in particular, a setting value "300 DPI" for the setting item "resolution" and a setting value "black and white" for the setting item "color mode," on all pages of the paper document. That is, it is assumed that the prescan DB 54 stores the contents illustrated in FIG. 5. Further, it is assumed that, for main scan setting, a setting value "300 DPI" for the setting item "resolution" and a setting value "color" for the setting item "color mode" are set.

Focusing on the setting item "resolution" first, since the setting value for the setting item "resolution" of the prescan setting is "300 DPI" and the setting value for the setting item "resolution" of the main scan setting is also "300 DPI," each prescan page data satisfies the main scan setting only for "resolution." If the resolution of the main scan setting is higher than the resolution of the prescan setting, the image data generator 62 may instruct the image reading unit 48 to scan all pages of the paper document with the main scan setting at the time when it is found that the resolution of the main scan setting is higher. Then the image data generator 62 may generate main scan page data corresponding to all pages of the paper document acquired by the scan, as image data.

The setting item "color mode" is focused next. For the setting item "color mode," the document property of each page of the paper document is also considered as described above, and hence it is judged whether or not the prescan page data satisfies the main scan setting for each page.

Since the document property of page 1 is "color," the image data generator 62 compares the setting value for the setting item "color mode" of the prescan setting with the setting value for the setting item "color mode" of the main scan setting. In this case, the setting value for the setting item "color mode" of the prescan setting is "black and white," and the setting value for the setting item "color mode" of the main scan setting is "color." That is, the grade of the main scan setting is higher than the grade of the prescan setting. Hence, the image data generator 62 judges that the prescan page data does not satisfy the main scan setting, for page 1. The image data generator 62 specifies page 1 of the paper document as a main scan target page that is a target of the main scan processing with the main scan setting, on the basis of the judgment.

Since the document property of page 2 to page 9 is "black and white," the image data generator 62 does not need to ensure the prescan setting and the main scan setting, and may judge that the prescan data satisfies the main scan setting, for page 2 to page 9. The image data generator 62 specifies page 2 to page 9 of the paper document as main scan non-target pages that each are not a target of the main scan processing, on the basis of the judgment.

Since the document property of page 10 is "color," similarly to page 1, the image data generator 62 judges that the prescan page data does not satisfy the main scan setting, for page 10. The image data generator 62 specifies page 10 of the paper document as a main scan target page that is a target of the main scan processing with the main scan setting, on the basis of the judgment.

As described above, the image data generator 62 divides pages of a paper document into main scan target pages and main scan non-target pages. Then, the image data generator 62 transmits main scan target page information indicative of whether each page of the paper document is a main scan target page or a main scan non-target page to the image reading unit 48.

The image reading unit 48 executes the scan processing with the main scan setting on the main scan target pages in the paper document on the basis of the main scan target page information. In contrast, the scan processing is not executed at the main processing on the main scan non-target pages in the paper document. In this exemplary embodiment, all pages of the paper document are set on the document plate before the main processing. Then, the image reading unit 48 sequentially sends all pages of the paper document to the reading position, and then executes the scan processing on the main scan target pages. However, the image reading unit 48 does not execute the scan processing on the main scan non-target pages and outputs the pages. In short, the image reading unit 48 sends the main scan non-target pages without processing. Accordingly, when the user sets all pages of the paper document on the document plate and then instructs the execution of the main processing, the user may automatically perform the scan processing only on the main scan target pages without consideration whether each page of the paper document is a main scan target page or a main scan non-target page.

The image data generator 62 acquires main scan page data acquired by the main scan processing on the main scan target pages. Also, the image data generator 62 acquires prescan page data corresponding to the main scan non-target pages from the prescan DB 54. Then the image data generator 62 generates image data of a mixture of the main scan page data and the prescan page data.

The generated image data is properly processed in accordance with the job input by the user. For example, for a scan job, image data is stored in the memory 52, for a copy job, the image forming unit 50 executes print processing on generated image data, and for a fax job, generated image data is faxed.

The overview for the configuration of the image processing system 10 according to this exemplary embodiment is as described above. With the image processing system 10, image data is generated by using at least part of prescan data acquired when a visually impaired person recognizes the contents of a document. Accordingly, the number of pages on which the main scan processing has to be executed for generating image data is decreased. Hence, the time required for the main processing is decreased. Further, with this exemplary embodiment, since the main scan non-target page is a page with prescan page data satisfying the main scan setting, the grade of the image data generated according to this exemplary embodiment is not lower than the grade of image data acquired by executing the scan processing with the main scan setting on all pages of the paper document. That is, with this exemplary embodiment, the time required for the main scan processing may be decreased while the quality of image data is maintained.

Figure 6:
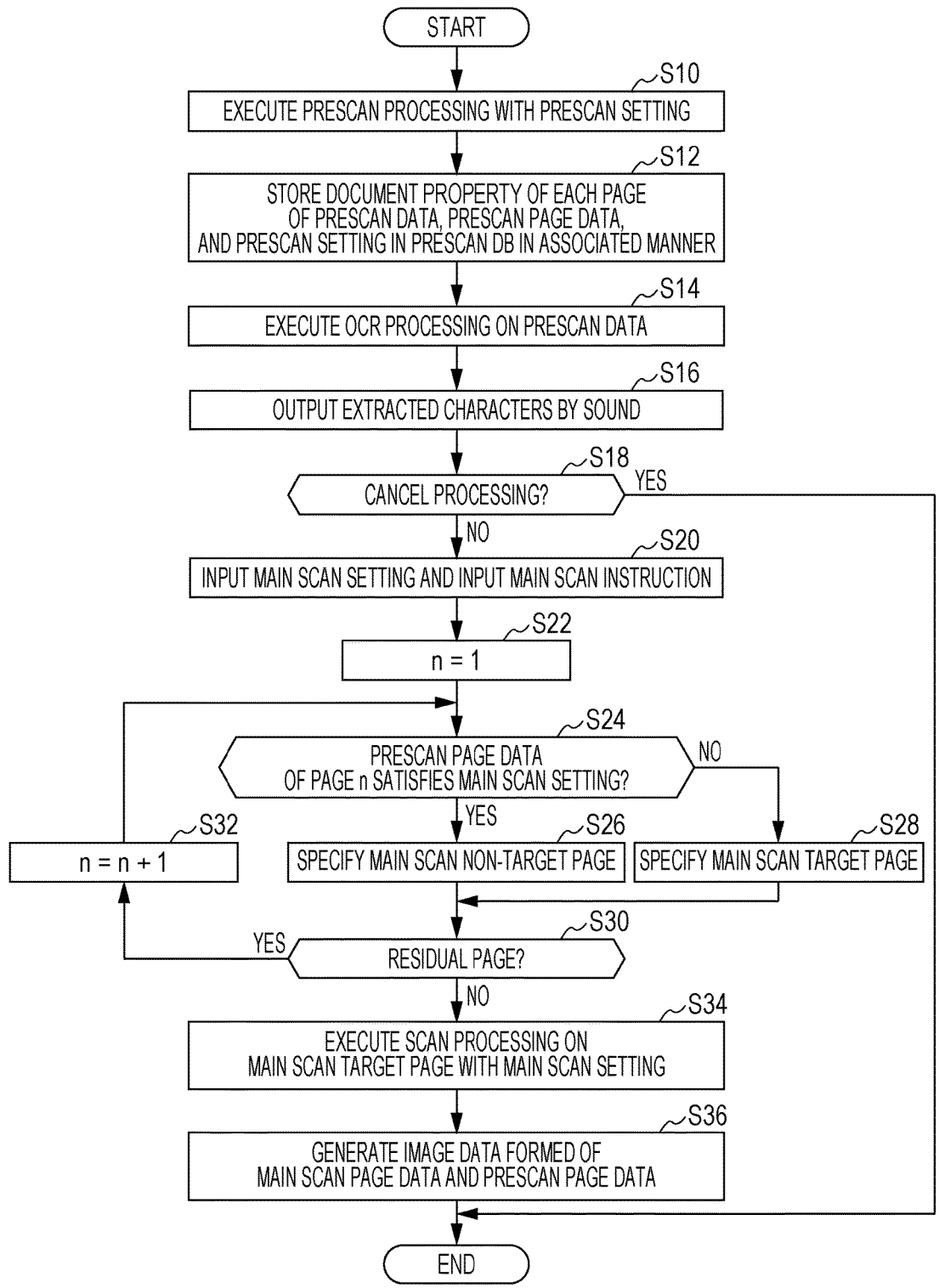
FIG. 6 is a flowchart illustrating a flow of processing of the image processing apparatus according to this exemplary embodiment.

A flow of processing of the image processing apparatus 14 according to this exemplary embodiment is described below with reference to the flowchart in FIG. 6.

In step S10, when the user uses the terminal apparatus 12 and instructs the image processing apparatus 14 to execute prescan processing, the image reading unit 48 executes the prescan processing on all pages of a paper document that is a document with predetermined prescan setting.

In step S12, the image reading unit 48 stores the document property of each page of the paper document, prescan page data, and prescan setting in the prescan DB 54 in an associated manner.

In step S14, the data analyzer 58 executes OCR processing on the prescan data (each prescan page data) stored in the prescan DB 54 in step S12. Accordingly, character information indicative of the contents of the paper document is extracted from the prescan data.

In step S16, the notification controller 60 causes the sound output unit 46 to output the character information extracted in step S14 by sound. Accordingly, the user who is a visually impaired person may recognize the contents of the paper document.

In step S18, the controller 56 judges whether or not execution of a job is canceled by the user. The user notified of the contents of the paper document by sound in step S16 continues the processing if the paper document is intended one. However, if the paper document is not intended one, the user may cancel the job. The cancel instruction may be input to the image processing apparatus 14 by an operation on the job application 22 that operates in the terminal apparatus 12. Alternatively, the user may cancel the job by directly operating the image processing apparatus 14. If the job is canceled by the user, the image processing apparatus 14 ends the processing without executing the processing in step S20 and later. If the job is continued, the processing goes to step S20.

In step S20, the user sets the paper document on the document plate again, inputs main scan setting in the image processing apparatus 14, and instructs execution of main scan processing. In this exemplary embodiment, the user inputs the main scan setting by directly operating the image processing apparatus 14 (that is, by using the input unit 44). Alternatively, the main scan setting may be input from the terminal apparatus 12.

Figure 7:
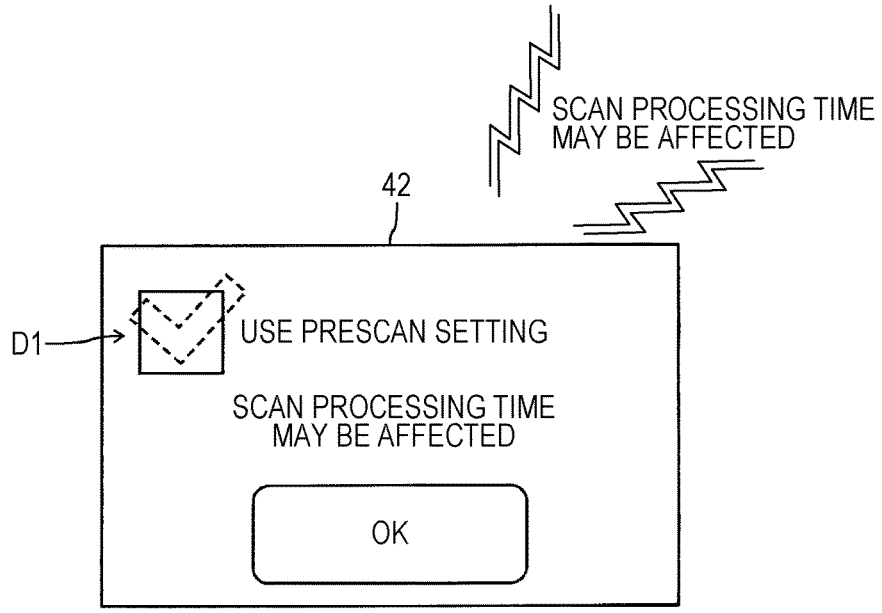
FIG. 7 illustrates an example of a prescan setting use select screen.

FIG. 7 illustrates a prescan setting use select screen displayed on the display 42 before the main scan setting is input. In the prescan setting select screen, the user may input the same setting as the prescan setting for the main scan setting by checking a checkbox D1 and touching "OK" button. In this exemplary embodiment, the checkbox D1 is initially checked. This urges the user to use the prescan setting as the main scan setting. If the prescan setting is used as the main scan setting, the image data generator 62 does not have to execute the main scan processing, and may use the prescan data previously stored in the prescan DB 54 as image data.

When the user unchecks the checkbox D1, the notification controller 60 causes the display 42 to display a message (alert) that notifies the user about that the scan processing time may be affected, and causes the sound output unit 46 to output the message by sound. That is, the notification controller 60 also functions as an alert output unit. This further urges the user to use the prescan setting as the main scan setting.

Referring back to FIG. 6, in step S22, the image data generator 62 initializes a variable n to 1. n is a variable indicative of the page number of the paper document.

In step S24, the image data generator 62 judges whether or not the prescan page data corresponding to page n satisfies the main scan setting on the basis of the document property of page n (in this case, page 1) of the paper document, prescan setting, and main scan setting.

If the prescan page data is judged as satisfying the main scan setting, in step S26, the image data generator 62 specifies page n of the paper document as a main scan non-target page. In contrast, if the prescan page data is judged as not satisfying the main scan setting, in step S28, the image data generator 62 specifies page n of the paper document as a main scan target page.

In step S30, the image data generator 62 judges whether or not the specification of whether the prescan page data is the main scan target page or the main scan non-target page is ended for all pages of the paper document. If the specification is not ended, n is incremented by 1 in step S32, and the processing in step S24 and later (that is, processing on the next page) is executed. If the specification is ended, the processing goes to step S34.

In step S34, the image data generator 62 transmits main scan target page information to the image reading unit 48. The image reading unit 48 executes scan processing (main scan processing) with the main scan setting on only main scan target pages of the paper document on the basis of the main scan target page information. Accordingly, main scan page data corresponding to each main scan target page is acquired.

In step S36, the image data generator 62 uses the main scan page data acquired in step S34 for the main scan target page, reads the prescan page data from the prescan DB 54 and uses the prescan page data for the main scan non-target page, and hence generates image data of a mixture of the main scan page data and the prescan page data.

Figure 8:
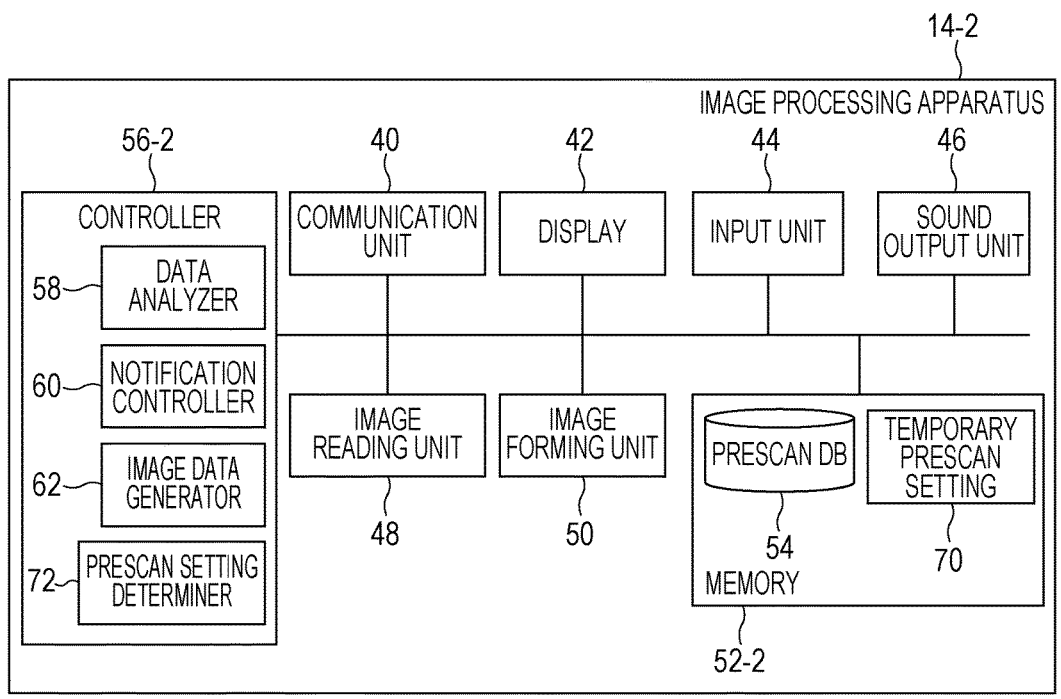
FIG. 8 is a schematic configuration diagram of an image processing apparatus according to a modification.

A modification is described below. FIG. 8 is a schematic configuration diagram of an image processing apparatus 14-2 according to the modification. For the image processing apparatus 14-2, the same reference signs are applied to components having the same functions as those of the image processing apparatus 14 according to the above-described exemplary embodiment, and the description thereof is omitted. The image processing apparatus 14-2 differs from the image processing apparatus 14 in that temporary prescan setting 70 as temporary preread setting is stored in a memory 52-2, and a controller 56-2 has a function as a prescan setting determiner 72.

In the exemplary embodiment, the prescan setting is previously determined. However, in the modification, the prescan setting is determined in accordance with the main scan setting.

The temporary prescan setting 70 is previously determined by a manager or the like of the image processing apparatus 14-2 and is stored in the memory 52-2. In this modification, as the temporary prescan setting, a setting value "300 DPI" is set for the setting item "resolution" and a setting value "black and white" is set for the setting item "color mode."

In this modification, the user inputs the main scan setting to the image processing apparatus 14-2 before the prescan processing. The prescan setting determiner 72 determines the prescan setting on the basis of the temporary prescan setting 70 and the input main scan setting. To be specific, the setting value of the temporary prescan setting is compared with the setting value of the main scan setting for each setting item, one with a higher grade of the two setting values is selected, and hence the prescan setting is determined.

For example, a case is considered in which, as the main scan setting, a setting value "600 DPI" is input for the setting item "resolution," and a setting value "black and white" is input for the setting item "color mode."

First, for the setting item "resolution," the prescan setting determiner 72 compares the setting value "300 DPI" in the temporary prescan setting with the setting value "600 DPI" in the main scan setting. Then "600 DPI" which is a higher grade setting is selected as the setting value for the setting item "resolution" in the prescan setting. Then, for the setting item "color mode," the prescan setting determiner 72 compares the setting value "black and white" in the temporary prescan setting with the setting value "black and white" in the main scan setting. In this case, the two setting values are the same and the grades are the same. Hence, "black and white" is selected as the setting value for the setting item "color mode" in the prescan setting. Accordingly, as the prescan setting, the setting value "600 DPI" is set for the setting item "resolution" and the setting value "black and white" is set for the setting item "color mode."

Prescan data that is generated by the prescan processing with thus set prescan setting may be used as image data without change for the main processing. Accordingly, with the modification, the image data for the main processing is acquired only by the prescan processing without the main scan processing.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus, comprising:
    a preread data acquisition unit that reads a document with preread setting, and acquires preread data including a plurality of preread page data; and
    a main processing data generation unit that generates main processing data on the basis of main read setting applied to main processing on the document, the preread setting, and a document property of each page of the document acquired by analyzing the preread data, by using, for a page with corresponding one of the preread page data satisfying the main read setting, the corresponding preread page data, and by using main read page data acquired by reading the document with the main read setting for a page with corresponding one of the preread page data not satisfying the main read setting, among pages included in the document.

2. The data processing apparatus according to claim 1, further comprising:
    a main read data acquisition unit that reads the document and acquires the main read page data at the main processing on the document, among the pages included in the document, the main read data acquisition unit to send without reading processing a page with corresponding one of the preread page data satisfying the main read setting, the main read data acquisition unit to execute the reading processing on a page with corresponding one of the preread page data not satisfying the main read setting and to acquire the main read page data.

3. The data processing apparatus according to claim 1,
    wherein previously determined temporary preread setting includes a setting item having a setting value, the main read setting includes a setting item having a setting value, and the preread setting is determined by selecting one of the setting values with a higher grade than a grade of the other one of the setting values on a setting item basis.

4. The data processing apparatus according to claim 1, further comprising:
    an alert output unit that, when a user selects the main read setting having a content different from a content of the preread setting, outputs an alert by sound to the user.

5. The data processing apparatus according to claim 1, further comprising:
    a character information extraction unit that extracts character information indicative of a content of the document from the preread data; and
    a document content notification unit that outputs the character information by sound before the main processing.

6. A non-transitory computer readable medium storing a data processing program causing a computer to execute a process for data processing, the process comprising:
    reading a document with preread setting, and acquiring preread data including a plurality of preread page data; and
    generating main processing data on the basis of main read setting applied to main processing on the document, the preread setting, and a document property of each page of the document acquired by analyzing the preread data, by using, for a page with corresponding one of the preread page data satisfying the main read setting, the corresponding preread page data, and by using main read page data acquired by reading the document with the main read setting for a page with corresponding one of the preread page data not satisfying the main read setting, among pages included in the document.

* * * * *